United States Patent [19]

Hoffecker et al.

[11] Patent Number: 5,325,505
[45] Date of Patent: Jun. 28, 1994

[54] INTELLIGENT STORAGE MANAGER FOR DATA STORAGE APPARATUS HAVING SIMULATION CAPABILITY

[75] Inventors: John C. Hoffecker, Berthoud, Colo.; Alan R. McNamara, MacGregor, Australia; Charles P. Schafer, Louisville, Colo.; Harry E. Smith, Lakewood, Colo.; Nathan E. Walsh, Boulder, Colo.

[73] Assignee: Storage Technology Corporation, Louisville, Colo.

[21] Appl. No.: 755,018

[22] Filed: Sep. 4, 1991

[51] Int. Cl.⁵ .......................................... G06F 12/02
[52] U.S. Cl. ................................. 395/425; 395/600;
395/50; 395/934; 364/DIG. 1; 364/243;
364/243.2; 364/245; 364/245.2; 364/246;
364/274; 364/274.1; 364/274.2; 364/274.3;
364/274.4; 364/274.5; 364/276.4; 364/282.1
[58] Field of Search ............ 395/425, 600, 50, 60,
395/934; 364/478

[56] References Cited

U.S. PATENT DOCUMENTS

| | | | |
|---|---|---|---|
| 4,771,375 | 9/1988 | Beglin et al. | 395/425 |
| 4,928,245 | 5/1990 | Moy et al. | 364/478 |
| 5,131,087 | 7/1992 | Warr | 395/425 |
| 5,164,909 | 11/1992 | Leonhardt et al. | 364/478 |

Primary Examiner—Paul V. Kulik
Attorney, Agent, or Firm—Duft, Graziano & Forest

[57] ABSTRACT

The intelligent storage manager includes a number of data bases which are used by the expert system software to manage the computer system data storage devices. One element provided in this apparatus is a set of data storage device configuration data that provides a description of the various data storage devices and their interconnection in the computer system. A second element is a knowledge data base that includes a set of functional rules that describe the data storage device management function. These rules indicate the operational characteristics of the various data storage devices and the steps that need to be taken to provide the various functions required to improve the performance of the computer system memory. In addition, various mathematical models are used to determine data relating to the operation of the data storage devices. These models not only assist in the identification of conflicts, but are also used to predict the effect of proposed conflict solutions. The models are also used to manage the addition of data storage devices to the computer system memory by identifying a plan to migrate existing data sets to this additional data storage devices.

44 Claims, 5 Drawing Sheets

INTELLIGENT STORAGE MANAGER FOR DATA STORAGE APPARATUS HAVING SIMULATION CAPABILITY

FIELD OF THE INVENTION

This invention relates to computer system memory and, in particular, to an intelligent storage manager for the data storage apparatus comprising the computer memory system. This intelligent storage manager both monitors the data retrieval efficiency of the computer system memory and either modifies data set storage locations, or system storage configurations, in response to memory performance conflicts detected in the computer system memory to optimize the level of service provided to the user.

PROBLEM

It is a problem in data processing systems to efficiently manage the storage of data sets on the computer system memory. Many large data processing systems include a hierarchy of data storage devices that are used by the computer systems contained therein. These data storage devices range from off line magnetic tape cartridge data storage systems to on line direct access storage devices which are directly connected to the computer system, cache memory and extended store (a variation of computer's main memory). Cache and extended store are fast on line memory for use with data sets that are frequently read by the computer system. It is difficult to dynamically allocate the location of the data sets in this hierarchal arrangement of data storage devices so that the frequency of data retrieval from these data sets matches the location and time wise retrieval efficiency of the data storage device. It is advantageous for computer system performance purposes to place the most frequently retrieved data sets in cache memory and the most infrequently retrieved data sets in the off line magnetic tape cartridge data storage systems.

From surveys done in the data processing field, in 1971 the median data processing system installation had 1.2 gigabytes of direct access data storage device capacity and these data storage devices had 450 data sets. In 1980, these numbers were 23 gigabytes of direct access data storage device capacity and 10,000 data sets. In 1988, surveys revealed that the typical or median installation had 208 gigabytes of direct access data storage device capacity which devices had 45,000 data sets stored therein. There is a continuing significant growth in the capacity of direct access data storage devices in the typical computer system. However, the utilization of these direct access data storage devices has fallen from 80% in the late 1960s to approximately 45% in the present time frame. Thus, there are significant increases in the cost of direct access data storage device memory with a decreasing efficiency in the use of these direct access data storage devices in the hierarchy of data storage devices in the computer memory.

It is a commonly used metric in the computer system field that in order to manage the computer system memory, it requires approximately 1 data management employee to manage every 10 gigabytes of data in a computer system installation. This data management person performs the functions of I/O optimization, data set conflict avoidance, conflict resolution, data set placement, and cache tuning in order to provide improved efficiency in the use of the direct access data storage devices in the computer system. Any improvement in the management of the data storage devices therefore reduces the number of data management employees required to manage the computer system memory. Newer data storage device architectures, e.g. distributed databases, client server, etc., present new dimensions to the storage performance management problem.

In addition to the problem of managing performance on a hierarchy of storage devices locally attached to a computer system (or to a computer complex consisting of multiple computer systems), network technologies and emerging computer system architectures have added two additional dimensions to the problem: geographical location and time. In a computer network environment, data can reside on data storage devices located in different geographic locations, e.g. Chicago and New York. Computer users frequently have service requirements which may require data to be made available on the local computer memory for a specific timeframe. A common example is that of a regional sales office which needs access to their client data for periodic update. Performance considerations may dictate that this data be stored locally during update, e.g. in Chicago, and then transferred to a central site, e.g. in New York City, for corporate processing.

This increased complexity of the data processing system and all the elements contained therein render the data storage device management task beyond the capability of data management personnel. These tasks must be automated and there presently exists no good solution to this problem.

SOLUTION

These problems are solved and a technical advance achieved in the art by the intelligent storage manager for data storage apparatus. This apparatus makes use of a knowledge based (expert) system to monitor in real time the performance of the computer system data storage devices, identify memory performance conflicts and resolve these conflicts by directing the relocation of data sets, or user workloads, to other segments of the computer system memory, and/or reconfiguring the computer system memory.

The subject apparatus includes a number of data bases which are used by the expert system software to manage the computer system data storage devices. One element provided in this apparatus is a set of data storage device configuration data that provides a description of the various data storage devices and their interconnection in the computer system. A second element is a knowledge data base that includes a set of functional rules that describe the data storage device management function. These rules indicate the operational characteristics of the various data storage devices and the steps that need to be taken to provide the various functions required to improve the performance of the computer system memory. In addition to these two data bases, this apparatus includes various mathematical models to determine data relating to the operation of the data storage devices. This additional data either cannot be directly measured or is not cost effective to measure. The additional data is used to assist in the identification of conflicts within the data storage apparatus. These models are also used to predict the effect of various data management actions and proposed solutions to identified conflicts. The models are also used to manage the addition of data storage devices to the computer system memory by identifying a plan to migrate existing data sets to these additional data storage devices in a manner to optimize the service level of the data processing system. Another element included in this intelligent storage manager is an automatic system configuration definition apparatus. This apparatus collects data generated within the data processing system to identify the data storage devices and their interconnection, without requiring user input. The determined configuration data is used to populate the configuration database.

Operating on these two data bases, in an interactive manner with the mathematical models, is an expert system, which is a computer program that uses explicitly represented knowledge and computational inference techniques to achieve a level of performance compatible to that of a human expert in that application area or domain. The expert system includes an inference engine, or technical equivalent, that executes the rules which comprise the basic intelligence of the expert system. The inference engine allows a virtually infinite number of rules or conditional statements to be chained together in a variety of ways. The inference engine manages the rules and the flow of data through those rules. Thus, the expert system uses the data stored in the configuration data base and the knowledge data base as well as data from monitoring of the actual performance of the data storage devices in the computer system and data derived from model to analyze, on a dynamic basis, the performance of the computer system data storage devices.

The expert system identifies memory performance conflicts such as a performance degradation of the computer system data storage devices due to a plurality of computers in the computer system attempting to access a common data storage device, or access to a given data set exceeding acceptable service levels. The expert system identifies the performance conflict as well as the data sets stored on these data storage devices related to this conflict. Once the data sets and user workload involved in the performance conflict are identified, the expert system determines alternative memory storage locations for these data sets and activates various software routines to transport these conflict data sets to the alternative data storage locations. Alternatively the expert system relocates the processing location of the user workload. The relocation of these conflict data sets and/or user workload resolves the memory performance conflict and improves the retrievability of the data stored on these data storage devices. By performing the conflict identification and resolution on a dynamic real time basis, the data storage devices of the computer system are operated in a more efficient manner and the retrievability of the data stored on these data storage devices is significantly improved without the need for the data management personnel. The intelligent storage manager continuously monitors and modifies the performance of the data storage devices associated with the computer system, even if the data storage devices are geographically dispersed. The intelligent storage manager identifies and resolves conflicts in a manner that accounts for the temporal, spatial and hierarchical characteristics of the data processing system.

DETAILED DESCRIPTION

The intelligent storage manager for data storage apparatus functions to monitor the performance of a computer system memory and manage this computer system memory in order to maximize performance. This function is accomplished by the use of a knowledge based (expert) system that monitors the activity of the various data storage devices in the computer system memory, identifies memory performance conflicts and take steps to resolve these conflicts in order to improve the performance of the computer system memory. This apparatus includes a number of databases which are used by the expert system software to manage the data storage devices.

DATA PROCESSING SYSTEM ARCHITECTURE

Figure 1:
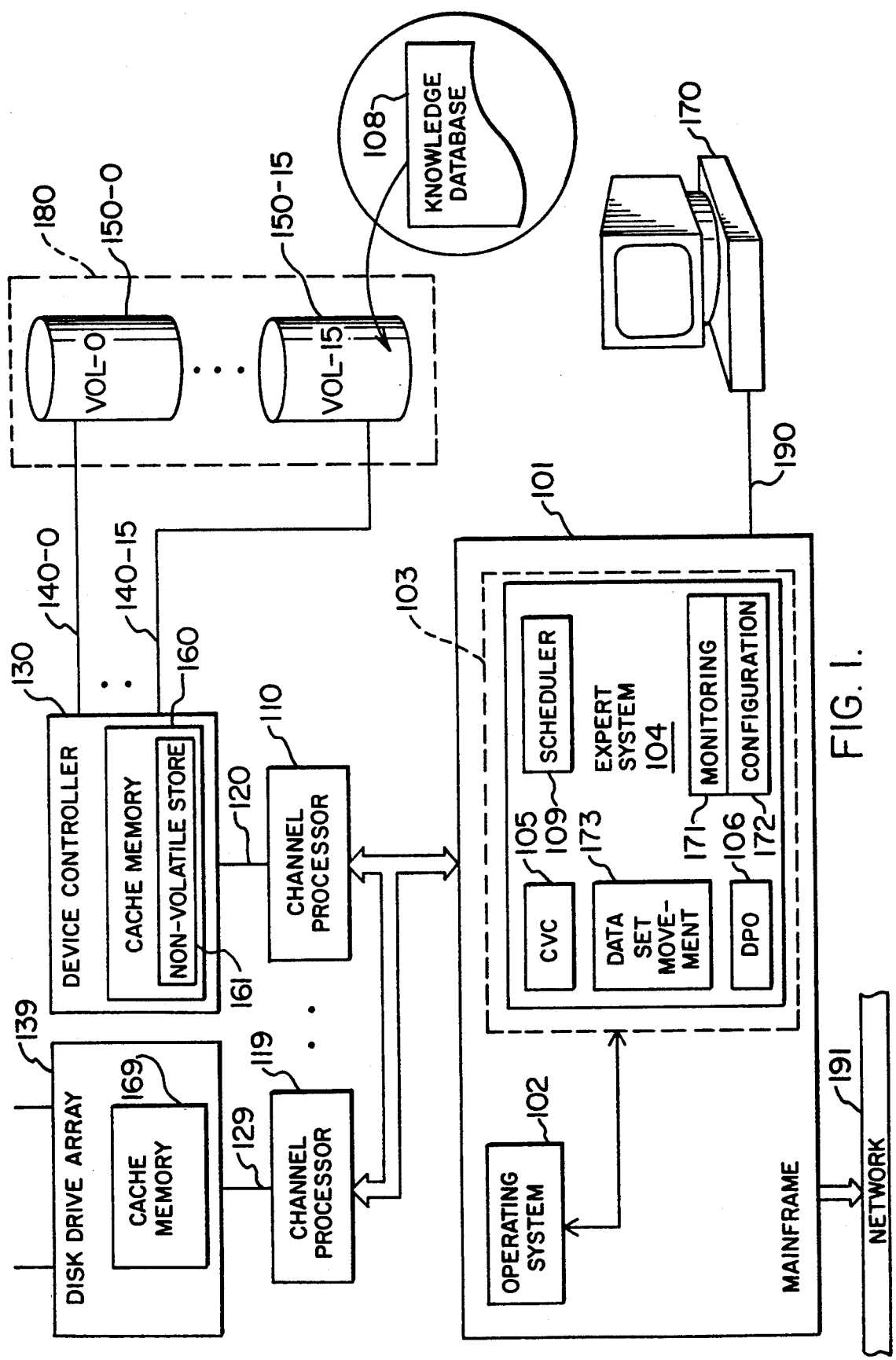
FIG. 1 illustrates, in block diagram form, the architecture of the intelligent storage manager.

FIG. 1 illustrates a typical computer system in block diagram form, which computer system includes the intelligent storage manager for data storage apparatus. This computer system consists of a mainframe 101 which can be any of a number of large computer systems such as an IBM 390 series, or an Amdahl 5990 computer. Each of these mainframe computers can process on the order of 10–20 MIPS per processor and are typically equipped with a significant amount of disk storage memory, typically on the order of 200 gigabytes of data storage capacity. Frequently such systems are configured into multi-system, multiple CPU complexes which share disk storage among the individual systems, and/or data across networks. For the purpose of illustration, assume that mainframe 101 is an IBM 3084 type of computer running an operating system 102 that typically is the MVS/XA operating system. These products are well known in the field and need no further explanation herein. Mainframe 101 is interconnected via a plurality of channel processors 110–119 to the data storage devices associated with mainframe 101. For the purpose of illustration, a number of disk storage devices 150-0 to 150-15 are illustrated in FIG. 1. Each of these disk drives are a commercially available device such as the IBM 3390 class device disk drive system or any other ones of the multitude of similar devices. In a typical configuration, sixteen disk drives 150-0 to 150-15 are connected via associated data channels 140-0, 140-15 to a device controller 130 which is typically an IBM 3990 class device type of controller. Device controller 130 functions to multiplex the data being read to and from the plurality of disk drives 150-0 to 150-15 onto a channel path 120 which interconnects device controller 130 with channel processor 110. Device controller 130 includes a cache memory 160, including a non-volatile store 161 to provide greater data transfer efficiency between mainframe 101 and the data storage devices 150-*, as is well-known in disk technology.

The computer system can be equipped with a plurality of channel processors illustrated in FIG. 1 as devices 110 to 119. Each channel processor 110 is interconnected with mainframe 101 and provides mainframe 101 with access to data storage devices connected to the channel processor. A multitude of data storage devices can be connected to mainframe 101 in this manner. For example, channel processor 119 is connected to a disk array 139 data storage device. The other data storage devices include tape drives, optical disk, solid state disk and other memory devices. While this block diagram illustrates a general computer system configuration, it in no way should be construed as limiting the applicability of the present invention. In particular, various memory configurations can be used to interconnect mainframe 101 with various data storage devices. In addition, the data processing system can include a plurality of computer systems, interconnected via network 191. The intelligent storage manager for data storage apparatus 103 is included in mainframe 101 and operator terminal 170 is connected via data link 190 to mainframe 101.

MEMORY CONFIGURATION AND MANAGEMENT

From a data management standpoint, the computer memory illustrated in FIG. 1 is viewed as a data storage subsystem 180 that consists of sixteen volumes of disk storage 150-0 to 150-15. Each volume of this data storage subsystem contains a plurality of data sets or data files. These data sets or data files are stored on one or more corresponding volumes in an ordered fashion by dividing the volume up into sub-elements. For example, in the 8380E disk drive, each volume consists of 1770 cylinders each of which includes fifteen data tracks. Each data track can store 47K bytes of data.

In operation, mainframe 101 accesses data stored on the data volumes in data storage subsystem 180 by transmitting a data retrieval request via the channel processor 110 associated with the data volume (e.g. - 150-0) that contains the requested data. This data retrieval request is transmitted by channel processor 110 over channel path 120 to device controller 130, which in turn manages the retrieval of the data from the designated data storage device 150-0. This data retrieval is implemented by device controller 130 monitoring the rotation of disk drive 150-0 to identify the beginning of the data set stored on a track of the disk drive 150-0. Once the disk has rotated sufficiently to place the beginning of the requested data set under the read/write heads of the disk drive 150-0, the data is transferred from disk drive 150-0 over data link 140-0 to device controller 130. Device controller 130 temporarily stores the retrieved data in cache memory 160 for transmission to mainframe 101 via channel path 120 and channel processor 110.

It is obvious that this is an asynchronous data transfer in that mainframe 101 transmits data retrieval requests to various device controllers, where these data retrieval requests are processed as the data sets become available. If too many data retrieval requests are made via one route, such as concentrating the requests on a specific volume or small subset of volumes, the performance of the computer system memory significantly degrades. Likewise if the inherent performance characteristics of the device are inadequate for the service level required for a given data set by a given user, a performance conflict exists. It is advantageous to distribute the data retrieval requests throughout the various channel processors, channel paths and disk drives to optimize the service time. Thus, an intelligent distribution of the data retrieval requests among the various volumes on each data storage subsystem and across all of the data storage subsystems significantly improves the memory performance. There are many choices available to improve memory performance such as moving data sets from one volume to another or moving a volume from one data storage subsystem to another, etc. It should also be noted that for purposes of this patent disclosure, the terms "string" and "subsystem" can be used interchangeably.

Another such improvement is the use of a cache memory, such as cache 160, which enables the more frequently accessed volumes to load data in cache memory 160 for more rapid data retrieval times. The volumes are selected as being suitable for caching based on the normal access pattern of the data sets that are stored therein. Any input and output accesses to the data that use the cache memory 160 benefit from the cache memory 160 by speeding up the data transfer time. In order to preserve data integrity, any writes that are performed cause the data to be written directly to the disk, or to a form of cache commonly called "non-volatile storage" 161 and therefore these operations gain benefit from a cache memory 160 depending on the specifics of each case. A good volume for caching is one that has a high read rate, high activity and input/output accesses concentrated in a small number of tracks rather than scattered across the entire disk. Volumes that satisfy these conditions have a high hit ratio and therefore the input/output reads often find the desired track in cache 160 and do not have to spend the time retrieving the data set from the disk as described above. Often, data storage subsystems contain no volumes that are cachable or the activity of volumes that are cachable accounts for only a fraction of the total input/output activity of the data storage subsystem. Newer storage technologies, such as disk array, data "farms", data servers, or single level storage, are represented by the disk drive array 139. These technologies present a functional image of DASD volumes to the channel 119. The physical storage of the data may vary considerably from the traditional DASD storage architecture, frequently involving a hierarchy of devices with varying performance characteristics. The performance management of these types od devices is the same as managing that of the mainframe 101. In fact the controllers for these types of devices are typically powerful computer processors. The central controller for such a device should be viewed as a mainframe 101 with attached physical storage devices.

CACHE PERFORMANCE IMPROVEMENT

In order to gain full benefit of the cache, it is possible to reorganize the data storage subsystem 180 in such a way as to increase the amount of input/output accesses that go to specific cache volumes. A significant problem is to reorganize the data storage subsystem 180 on a data set level so as to separate the possible caching data sets from data sets that would degrade the cache performance and, in the process, create entire volumes that are suitable for storage in the cache memory 160. It is obvious that restructuring the data set organization can entail a complete restructuring of the volumes of the data storage subsystem 180 which involves an enormous number of data set moves to accomplish. Instead of a complete reorganization of the data storage subsystem 180, a better approach is to identify places on the subsystem where conflicts exist between possible cache data and data that is detrimental to the cache 160. The conflict exists where there is good cache data and bad cache data on the same volume: if the volume where cached in order to obtain the benefit of caching the good data, the bad data would cause so much interference in the cache 160 that the overall performance would actually deteriorate. The intelligent storage manager locates conflicts and then moves the smallest number of data sets in order to resolve the conflict. Using this approach, a small number of moves provides a large increase in performance and better utilization of the cache memory 160.

In order to determine which data sets are possible candidates for caching and which data sets should not be cached, the input/output activity of the data storage subsystem 180 is monitored over a period of time and data is recorded on a data set basis. This stored data consists of the input/output activity (the number of input and output operation to the data set), the read percentage (percentage of operations that were reads), and the locality of reference measure, which is defined as the number of input and output to the data set divided by the number of unique tracks covered by those inputs and outputs over the period monitored. Along with these numbers, is stored the name of the data set, its size in bytes and a value called the reason code that flags data sets that are not suitable for moving. This data is used by the intelligent storage manager in identifying the data sets that are to be moved and the target location for these data sets.

INTELLIGENT STORAGE MANAGER FOR DATA STORAGE APPARATUS

Figure 2:
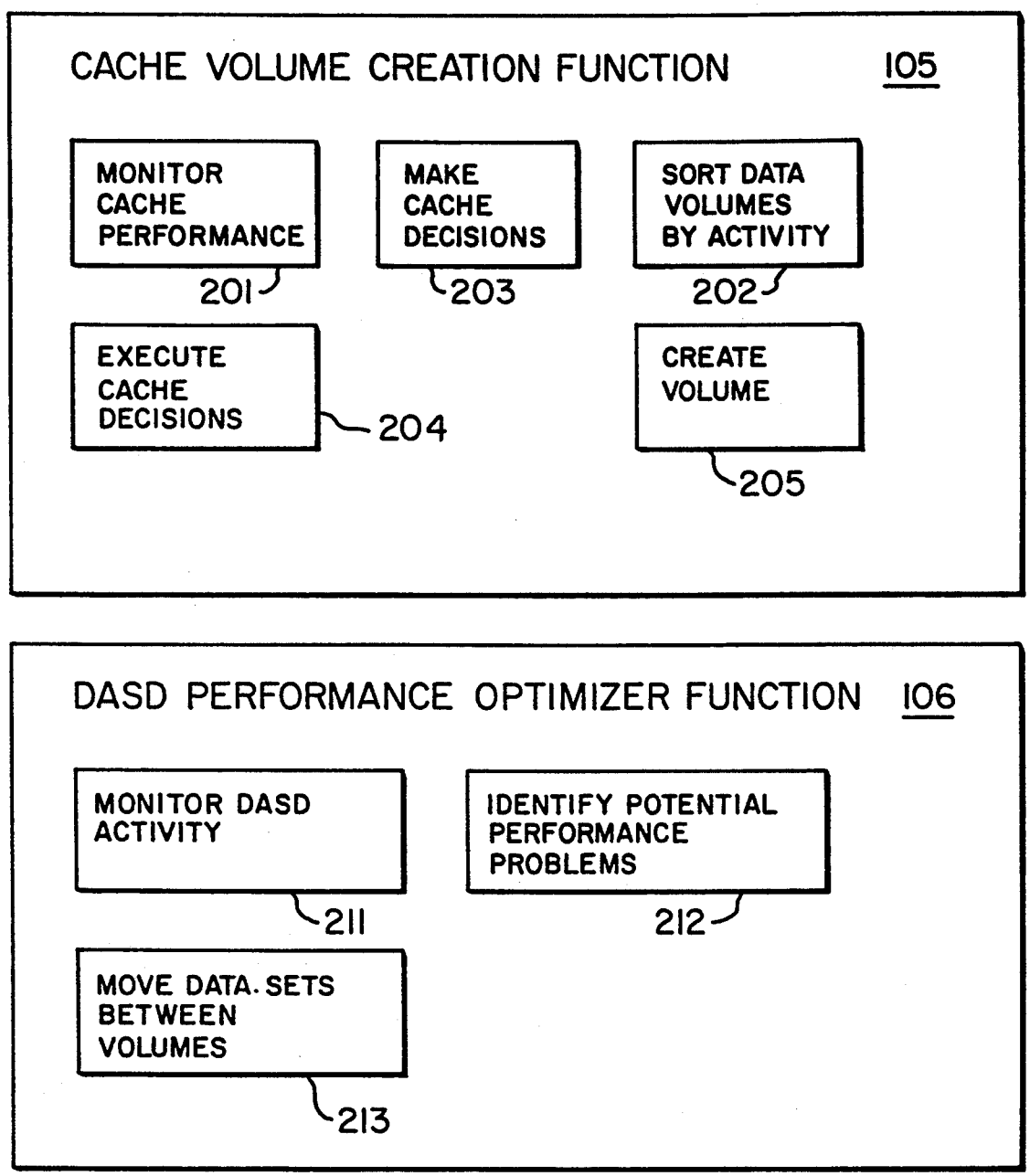
FIG. 2 illustrates in block diagram form, the architecture of the cache tuning and DASD performance optimizer elements of the intelligent storage manager.

The intelligent storage manager consists of a set of integrated data storage management functions that use knowledge or expert system techniques to monitor and automatically assist in the control of performance of the direct access data storage sub-systems. FIG. 2 illustrates the principal components of the intelligent storage manager 103. Intelligent storage manager 103 interfaces with and runs on the MVS operating system 102 of mainframe 101. In multiple system complexes, at least the monitoring activity 171 must be running on all systems. Data collected from all systems is processed on one of the systems by the complete cache volume creation 105 and DASD performance optimizer 106. The MVS operating system 102 provides device management, file management, test management, processor management, communication management and a number of other administrative functions to the intelligent storage manager 103.

In order to clarify terminology, the various aspects of knowledge systems are discussed. Knowledge systems are computer based systems that emulate human reasoning by using an inference engine or technical equivalent to interpret the encoded knowledge of human experts that is stored in a knowledge base. If the domain of the knowledge base is sufficiently narrow and a sufficiently large body of knowledge is properly coded in the knowledge base, then the knowledge system can achieve performance that matches or exceeds the ability of a human expert. In such a case, the knowledge system becomes an expert system.

One step in building an expert system is obtaining and encoding the collective knowledge of human experts into the machine readable expert system language. The specific implementation details of this encoding step is largely a function of the particular syntax of the expert system programming language selected. As an example one such expert system programming language is PROLOG which is described in the text "Programming In Prolog" by W. F. Clocksin and C. S. Mellish, Springer Verlag Inc., New York, N.Y. (1981). Basically, the expert system contains a set of rules and instructions on how the rules are to be applied to the available facts to solve a specific problem.

In the intelligent storage manager 103, expert system techniques are used to monitor the performance of the computer system memory. The Configuration module 172 is a key element of the intelligent storage manager 103. The Configuration module 172 analyzes the system configuration of memory devices based on definitions in the operating system 102 on every computer in the complex(s) and queries sent to every element in the configuration to determine nature. It builds a model configuration which is presented to an administrator for review and approval. If the administrator desires to change the configuration he/she can do so thru an interactive computer session. The facts gathered through this monitoring operation are then used to identify modifications to the organization of the computer system memory as well as the data stored therein to improve the performance of the computer system memory. FIG. 2 illustrates some of the various routines or subsystems that are implemented in intelligent storage manager 103.

Included are cache volume creation function 105, and DASD performance optimizer function 106. Cache subsystems often end up in a state where there are no volumes on the DASD subsystem suitable for caching, or where the number of I/Os to cached volumes account for only a fraction of the total number of I/Os to the data storage subsystem. The cache volume creation function 105 creates volumes (205) on the data storage subsystem that are suitable for caching. Cache volume creation 105 monitors (201) the performance of the cache memory 160 and identifies where cache candidate data sets are in conflict with data sets that are unsuitable for caching (202). Cache volume creation 105 analyzes the data set conflicts and recommends data set movements (203) that separate the good candidates from the bad candidates thereby concentrating the cache candidate data sets on a few cachable volumes. The cache volume creation 105 analyzes one DASD subsystem each time it is invoked by scheduler 109 and attempts to achieve the maximum effect with the minimum number of data set moves (204). DASD performance optimizer 106 makes data set movement recommendations to improve the performance and utilization of the DASD devices 150-0 to 150-15. DASD performance optimizer 106 operates in a proactive manner, moving data sets from conflict volumes and subsystems to non-conflict volumes and subsystems. DASD performance optimizer 106 monitors (211) the activity on the DASD devices 150-0 to 150-15 and identifies (212) potential DASD performance problems caused by data contention or failure to meet required service levels. DASD performance optimizer 106 then relocates (213) data sets between volumes to avoid performance conflicts.

Scheduler 109 controls the operation of all functions and determines when activities can take place. Parameters used to establish a schedule are: installation size, peak processing times, list of functions to execute, user provided constraints and various indicators of performance conflicts. Data Monitoring module 171 records information on the I/O activity of all devices on a pre-scheduled basis (e.g. hourly totals). In addition, detailed volume activity data and track data can be recorded. Monitoring module 171 creates the statistical information required by the remaining modules of the system. Database 108 contains the system configuration information as well as the statistical activity data. Those skilled in this art will appreciate that in the use of the term "database", it is contemplated that "knowledge", "statistical data" and "configuration" are contained in the general data repository. Database 108 is illustrated as being stored on disk drive 150-15, although it could also be stored in intelligent storage manager 103 on mainframe computer 101.

CACHE VOLUME CREATION

The Cache Volume Creation (CVC) module 105 is one of the performance tuning routines of the intelligent storage manager 103. The cache volume creation module 105 uses Expert System techniques to analyze cache subsystems and make recommendations that improve input/output I/O performance in the computer system memory.

Because of the difficulty involved with using cache properly, or because of a lack of data management employees to do the job, cache subsystems often end up in a state where there are no volumes on the data storage subsystem suitable for caching, or where the number of I/Os to cached volumes account for only a fraction of the total number of I/Os to the data storage subsystem. The purpose of the cache volume creation module is to remedy this situation by attempting to create volumes on the subsystem which are suitable for caching.

There may very well be data sets on the data storage subsystem which would benefit from cache, but because the cache operates on a volume basis and the data sets reside on volumes which would be detrimental to I/O performance if cached, these data sets can't be cached. The IBM facility called Dynamic Cache Management, DCM, attempts to address this problem. However it is still limited by the cache characteristics of the data sets on the volume and by user supplied cache objectives, and hence would benefit from the output of cache volume creation module 105. The job of the cache volume creation module is to identify where cache candidates are in conflict with data sets that are unsuitable for caching and recommend movements that separate the good candidates from the bad candidates, thereby concentrating the cache candidate data sets on a few cachable volumes. The cache volume creation module 105 can also recommend changes to user supplied cache objectives in IBM's System Managed Store (SMS) to increase the efficiency of IBM's DCM facility. For purposes of this description, this will be referred to as "DCM changes". The cache volume creation module 105 tries to achieve the maximum performance improvement with the minimum number of changes.

CACHE VOLUME CREATION OVERVIEW

The way that the cache volume creation module 302 operates is to first identify which data sets on the subsystem need to be cached. Those data sets that are good cache candidates are classified as good, and those which are bad cache candidates are classified as bad. Based on the classification of the data sets, the cache volume creation module 302 then determines which volumes are good cache volumes, which are bad, and which have good data sets in conflict with bad data sets. The volumes are classified as good, bad, and conflict respectively. The number of cache volumes required is then determined as are the data set moves or DCM changes needed to create this number of cache volumes. Then the conflict volumes are processed and the good data sets are separated from the bad data sets. Finally, the cache volume creation module 302 executes a last pass which checks if it can make significant improvements to cache candidate volumes with one or two moves.

CACHE VOLUME CREATION MODULE

Figure 3:
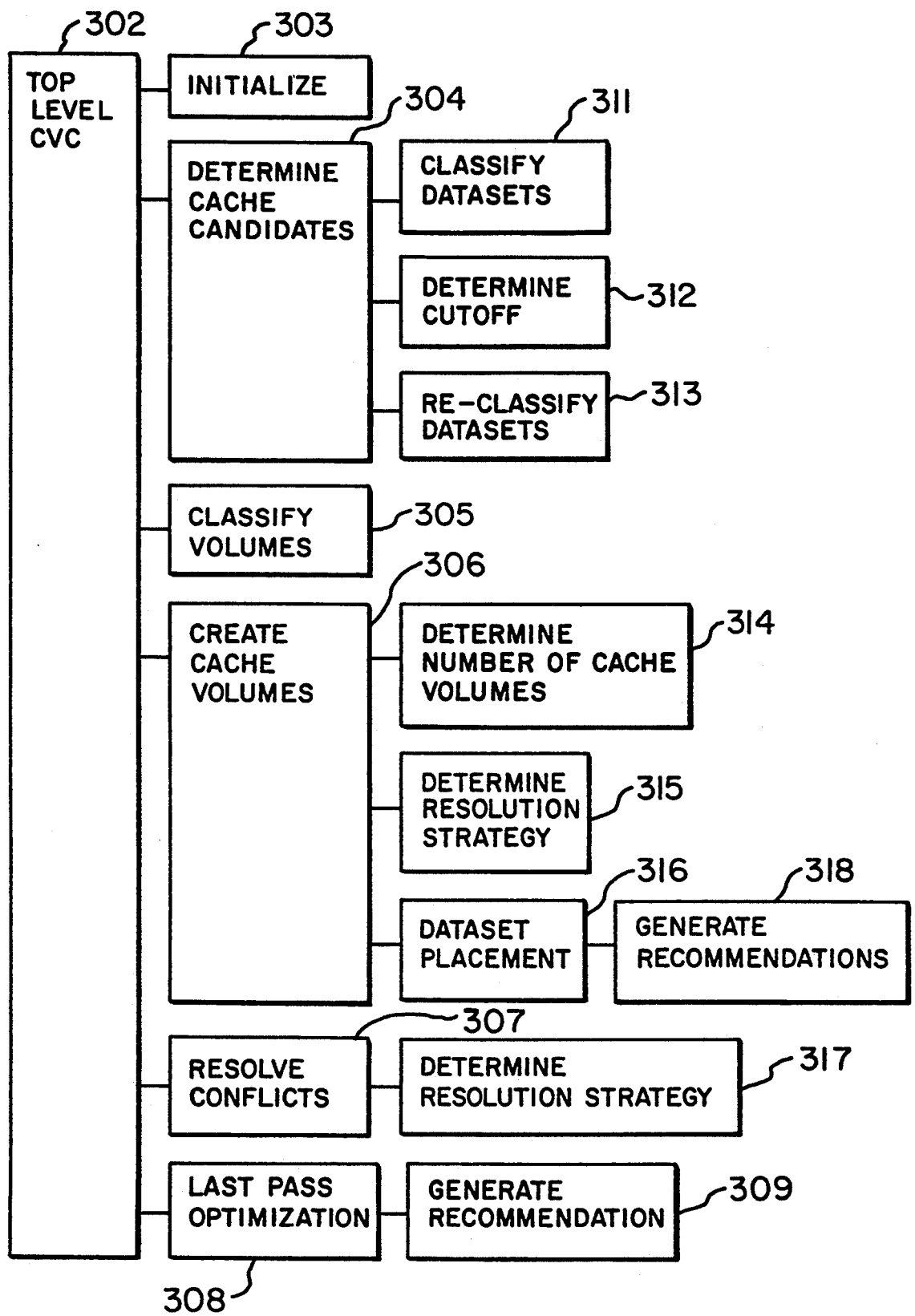
FIGS. 3 and 4 illustrate the elements that comprise the cache tuning and DASD performance optimizer elements of the intelligent storage manager.
Figure 4:
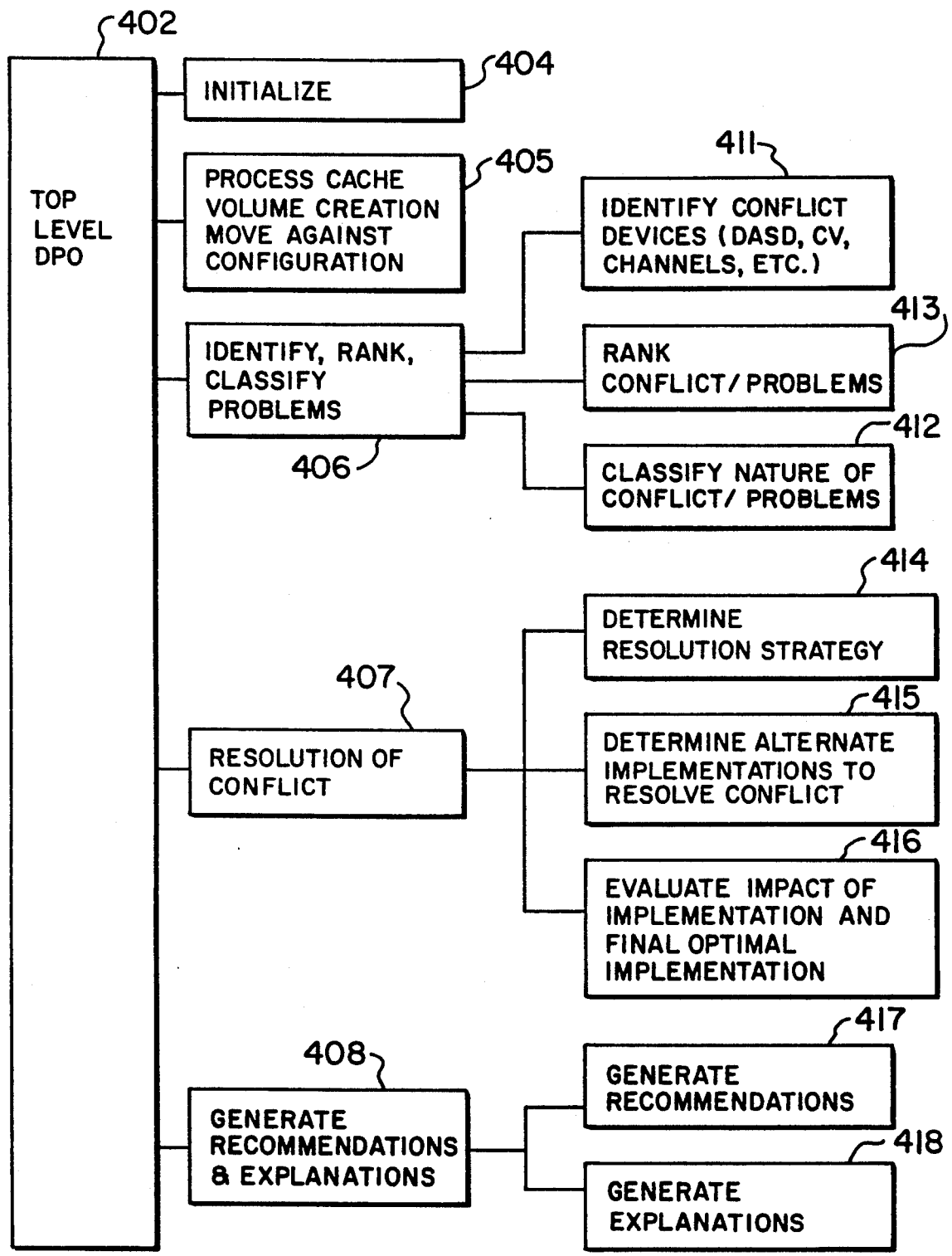

The cache volume creation module 302 contains the function entry point that is called by the scheduler 109. The cache volume creation module 302 then executes the sub-modules 303–308 as shown in FIG. 3. When the cache volume creation module 302 exits it calls operating system 102 to execute the list of recommended data set movements and/or DCM changes and update the knowledge database 108 with the recommendations.

On entry, a pointer to a subsystem record for the subsystem being analyzed is passed. This record contains the subsystem information and also contains a pointer to the list of volume records, one for each volume of the subsystem. Each of the volume records contains the volume information and a pointer to the list of data set records, one for each data set on the volume. Each data set record contains information on data set activity.

INITIALIZE

The initialize module 303 performs the initialization required by the cache volume creation function including any data format conversion that needs to take place. The initialize module 303 also looks for data sets with moves scheduled for them. At the time the data is collected for analysis, these data set moves had not been completed, but by the time any moves recommended by the current analysis are performed, these moves will have been carried out. This means that the state of the machine is different from the time the data was collected to the time the data set move recommendations are implemented and so data set move recommendations are based on the system as it would look if the moves already scheduled had been performed. The initialize module 303 alters the input data to reflect this state of the system.

DETERMINE CACHE CANDIDATES

The purpose of the determine cache candidates module 304 is to determine which data sets on the subsystem to place on cached volumes. First the routine Classify Data Sets 311 is called which classifies the data sets as good, bad, or inactive based on how well they will perform if they are cached, based on models of the specific device type. Then the routine Determine Cutoff 312 is called. This routine determines if there is too much cache candidate data on the subsystem for the size of the cache and if so determines a cutoff that reduces the amount of cache candidate data down to the best data sets the size of cache will cope with. The Reclassify Data Sets 313 routine then reclassifies the cache candidate data sets that fall below the cutoff and flags them for possible movement to another cache subsystem.

CLASSIFY DATA SETS

The classify data set routine 311 classifies the data sets on the subsystem as good cache candidates, bad cache candidates, or inactive data sets. The classification is done by some simple rules of thumb based on the activity, the read percent, and the LORM of the data set. (The LORM is the Locality Of Reference Measure and is equal to the number of I/Os per second divided by the number of unique tracks accessed over the monitored period.)

As well as classifying the data sets as being good or bad cache candidates, the classify data sets module also classifies the good data sets into classes which reflect the degree to which the data set is suitable for caching. Thus, in selecting data sets to cache for the given cache size, the classify data sets module attempts to include the better cache candidates.

RULES

The rules used for classifying the data sets are shown below, where x, y and z are variables that are selected as optional for the particular device characteristics and the user's needs.

(1)

if
1. there was no activity on the data set
then the data set is inactive (2)

if
1. the read % of the data set > x and
2. the LORM > y and
3. the I/O rate > z per second
then the data set is good (3)

if
1. (a) the read % < x or
   (b) the LORM < y or
   (c) the I/O rate < z per second and
2. there was some activity on the data set
then the set is bad

DETERMINE CUTOFF

The determine cutoff routine 312 is responsible for deciding which cache candidates identified by the classify data sets routine 311 should be cached based on the size of the cache. Starting with the best cache candidates, and based on attributes of the data sets such as activity, read percent, and LORM, the determine cutoff routine 312 works its way down the list of cache candidates until a sufficient number of cache candidates are selected for the available cache size. This is where the determine cutoff routine 312 determines there should be a cutoff with those data sets above the cutoff being cached. In deciding where the cutoff is, the determine cutoff routine 312 also looks at the currently cached data and the read hit rate of the cache and devices. This way, if the cache is being overloaded, some data sets can be moved off the cache volumes and flagged for possible movement off the subsystem. Similarly, if the cache is performing better than expected and can handle more data, some more cache candidates are moved onto the cache volumes. If the determine cutoff routine 312 determines that the given cache size can handle more than the amount of cachable data that is available on the subsystem, the determine cutoff routine 312 flags the subsystem as having an under-utilized cache.

RECLASSIFY DATA SETS

Using the cutoff determined by the determine cutoff routine 312, the reclassify data sets routine 313 reclassifies the data sets which fall below the cutoff as bad data sets and flags them for possible movement to another cache subsystem.

CLASSIFY VOLUMES

The classify volumes routine 305 classifies the volumes of the subsystem as being good, bad, or conflict volumes based on whether the volume is a good cache candidate, a bad cache candidate, or whether there is good cache data in conflict with bad cache data on the volume. The classify volumes routine 305 uses the classifications of the data sets to determine the classification of the volume. If the volume predominantly consists of good data sets, then the volume is classified as good. If the volume consists totally of bad data sets, then the volume is classified as a bad volume. If there is good data on the volume but there is also a significant amount of bad data, then there is a conflict between the good and bad data and the volume is classified as a conflict volume.

RULES

The rules used to perform the volume classification are shown below where n is a predetermined threshold selected as a function of the characteristics of the device being monitored and the needs of the user.

(1)

if
1. there are no good data sets on the volume
then the volume is bad (2)

if
1. there is good data on the volume and
2. the amount of bad data accounts for more than n of the total activity of the volume
then the volume is a conflict volume (3)

if
1. there is good data on the volume and
2. the amount of bad data accounts for less than n of the total volume activity
then the volume is good

CREATE CACHE VOLUMES

The create cache volumes routine 306 is responsible for deciding how many cache volumes there should be on the subsystem and creating them if there are not enough good volumes already in existence. First the determine number of cache volumes routine 314 is used to determine the desired number of cache volumes based on a predetermined device activity level and space constraints. The number of desired cache volumes is compared with the number of good cache volumes in existence to determine how many more good cache volumes must be created. The Determine Resolution Strategy routine 315 decides how to resolve the conflicts on conflict volumes. The determine resolution strategy routine 315 finds volume that will end up as good volumes by looking for volumes where the resolution strategy is to move the bad data sets off the volume. This is how the determine resolution strategy routine 315 creates the required number of cachable volumes. If there are not enough conflict volumes with a resolution strategy of moving the bad data sets, then the Create Cache Volumes routine 306 finds volumes which require the least number of moves to turn into good volumes. The Data Set Placement routine 316 is used to decide where to relocate data sets needing movement to create cachable volumes.

DETERMINE NUMBER OF CACHE VOLUMES

The determine number of cache volumes routine 314 decides how many cache volumes there should be on the subsystem. It bases this decision on the space requirements of the identified cache candidates, the activity of the cache and non-cache candidates, the anticipated read hit rate of the cache and the devices, and the amount of space on the whole subsystem. The aim is to have enough cache volumes that device busy queuing is not a problem and space requirements for cache data are met, as well as trying to minimize device contention problems and space problems on non-cache volumes.

RESOLVE CONFLICTS

The resolve conflicts routine 307 processes the remaining conflict volumes by resolving the conflicts on the volumes. A conflict is where there is cache data and a significant amount of non-cache data residing on the same volume. The volume can't be cached because the bad data would degrade the performance of the cache too much. The resolve conflicts routine 307 decides on a resolution strategy, and then implements the strategy.

The resolution strategy is determined by the Determine Resolution Strategy routine 317 and can be one of
1. move good,
2. move bad, or
3. salvage good.

That is, in order to resolve the conflict, one of the following actions can be selected
1. move the good data sets to good volumes,
2. move the bad data sets to bad volumes, or
3. salvage as many good data sets as we can by moving the movable good data sets with significant activity to good volumes.

Once the resolution strategy has been directed, the Data Set Placement routine 316 is used to decide where to move the identified data sets.

DETERMINE RESOLUTION STRATEGY ROUTINE

Given a conflict volume, the best way of eliminating the conflict must be determined, that is, the best way to separate the good and bad data from each other. The good data sets can be relocated off the volume, the bad data sets can be relocated off the volume, or as many good data sets as possible can be salvaged.

Salvaging the good data sets is used as a last resort where it is not possible to move the bad data sets off the volume due, perhaps, to immovable data sets or the number of moves involved and it is similarly not possible to move all of the good data sets off the volume. Under these circumstances, good data sets are salvaged by moving those good data sets that have significant activity and which are movable, and/or by altering cache objectives for DCM. In referencing bad data sets on a conflict volume, what is actually meant is a selected subset of the bad data sets. A good volume can still have bad data sets on it as long as the activity due to the bad data sets is less than n% of the volume activity. Thus, in order to turn a conflict volume into a good volume enough bad data sets must be moved to reduce the bad activity to this level. The selected bad data sets are then those which if moved off the volume would reduce the amount of bad activity to below n% of the volume activity.

The factors which influence the decision about which resolution strategy to use are listed below.
1. immovable bad
2. immovable good
3. willing to move bad
4. willing to move good
5. which needs more moves
6. which has more activity
7. good data sufficiently active
8. which is more immovable
9. some bad is totally immovable
10. some good is totally immovable
11. enough unwilling good Each of these factors is represented as an attribute of the conflict volume whose value is derived from input data and other attributes. The derivation of the value of the above attributes and the attributes from which these values are obtained are explained in detail in later sections.

RULES

The rules which use these factors to decide on a strategy to use to resolve the conflict are shown below.

(1)

If
1. there are no immovable bad data sets and
2. there are some totally immovable bad data sets
Then the resolution strategy is ERROR (2)

If
1. there are no immovable good data sets and
2. there are some totally immovable good data sets
Then the resolution strategy is ERROR (3)

If
1. the good and bad data are equally immovable and
2. there are some immovable good data sets and
3. there are no immovable bad data sets
Then the resolution strategy is ERROR (4)

If
1. the good and bad data are equally immovable and
2. there are some immovable bad data sets and
3. there are no immovable good data sets
Then the resolution strategy is ERROR (5)

If
1. the good and bad data are equally immovable and
2. there are some totally immovable good data sets and
3. there are no totally immovable bad data sets
Then the resolution strategy is ERROR (6)

If
1. the good and bad data are equally immovable and
2. there are some totally immovable bad data sets and
3. there are no totally immovable good data sets
Then the resolution strategy is ERROR (7)

If
1. the good data is more immovable and 2. there are no immovable good data sets
Then the resolution strategy is ERROR (8)

If
1. the bad data is more immovable and
2. there are no immovable bad data sets
Then the resolution strategy is ERROR (9)

If
1. the good data is more immovable and
2. there are some totally immovable bad data sets
Then the resolution strategy is ERROR (10)

If
1. the bad data is more immovable and
2. there are some totally immovable good data sets
Then the resolution strategy is ERROR (11)

If
1. we are willing to move all of the good data sets and
2. we are not willing to move the bad data and
3. there are no immovable good data sets
Then the resolution strategy is MOVE_GOOD (12)

If
1. we are willing to move the bad data and
2. we are not willing to move all of the good data sets and
3. there are no immovable bad data sets and
4. there is enough unwilling good data to justify any extra moves required to move the bad data
Then the resolution strategy is MOVE_BAD (13)

If
1. we are willing to move all of the good data sets and
2. we are not willing to move the bad data and
3. there are some immovable good data sets and
4. the good data is sufficiently active and
5. there are no totally immovable good data sets
Then the resolution strategy is MOVE_GOOD (14)

If
1. we are willing to move the bad data and
2. we are not willing to move all of the good data sets and
3. there are some immovable bad data sets and
4. the good data is sufficiently active and
5. there is enough unwilling good data to justify any extra moves required to move the bad data and
6. there are no totally immovable bad data sets
Then the resolution strategy is MOVE_BAD (15)

If
1. we are willing to move all of the good data sets and
2. we are willing to move the bad data and
3. there are no immovable good data sets and
4. there are no immovable bad data sets and
5. the good data requires more moves
Then the resolution strategy is MOVE_BAD (16)

If
1. we are willing to move all of the good data sets and
2. we are willing to move the bad data and
3. there are no immovable good data sets and
4. there are no immovable bad data sets and
5. the bad data requires more moves
Then the resolution strategy is MOVE_GOOD (17)

If
1. we are willing to move all of the good data sets and
2. we are willing to move the bad data and
3. there are no immovable good data sets and
4. there are no immovable bad data sets and
5. the good and bad data require the same number of moves and
6. the good data has more activity
Then the resolution strategy is MOVE_BAD (18)

If
1. we are willing to move all of the good data sets and
2. we are willing to move the bad data and
3. there are no immovable good data sets and
4. there are no immovable bad data sets and
5. the good and bad data require the same number of moves and
6. the bad data has higher activity
Then the resolution strategy is MOVE_GOOD (19)

If
1. we are willing to move all of the good data sets and
2. we are willing to move the bad data and
3. there are some immovable good data sets and
4. there are no immovable bad data sets
Then the resolution strategy is MOVE_BAD (20)

If
1. we are willing to move all of the good data sets and
2. we are willing to move the bad data and
3. there are no immovable good data sets and
4. there are some immovable bad data sets
Then the resolution strategy is MOVE_13_GOOD (21)

If
1. we are willing to move all of the good data sets and
2. we are willing to move the bad data and
3. there are some immovable good data sets and
4. there are some immovable bad data sets and
5. the good data is sufficiently active and
6. the good data is more immovable than the bad data and
7. there are no totally immovable bad data sets
Then the resolution strategy is MOVE_BAD (22)

If
1. we are willing to move all of the good data sets and
2. we are willing to move the bad data and
3. there are some immovable good data sets and
4. there are some immovable bad data sets and
5. the good data is sufficiently active and 6. the bad data is more immovable than the good data and
7. there are no totally immovable good data sets Then the resolution strategy is MOVE_GOOD (23)

If
1. we are willing to move all of the good data sets and
2. we are willing to move the bad data and
3. there are some immovable good data sets and
4. there are some immovable bad data sets and
5. the good data is sufficiently active and
6. the good and bad data are equally immovable and
7. there are no totally immovable good data sets and
8. there are no totally immovable bad data sets and
9. the good data requires more move Then the resolution strategy is MOVE_BAD (24)

If
1. we are willing to move all of the good data sets and
2. we are willing to move the bad data and
3. there are some immovable good data sets and
4. there are some immovable bad data sets and
5. the good data is sufficiently active and
6. the good and bad data are equally immovable and
7. there are no totally immovable good data sets and
8. there are no totally immovable bad data sets and
9. the bad data requires more moves Then the resolution strategy is MOVE_GOOD (25)

If
1. we are willing to move all of the good data sets and
2. we are willing to move the bad data and
3. there are some immovable good data sets and
4. there are some immovable bad data sets and
5. the good data is sufficiently active and
6. the good and bad data are equally immovable and
7. there are no totally immovable good data sets and
8. there are no totally immovable bad data sets and
9. the good and bad data require the same number of moves and
10. the good data has higher activity Then the resolution strategy is MOVE_BAD (26)

If
1. we are willing to move all of the good data sets and
2. we are willing to move the bad data and
3. there are some immovable good data sets and
4. there are some immovable bad data sets and
5. the good data is sufficiently active and
6. the good and bad data are equally immovable and
7. there are no totally immovable good data sets and
8. there are no totally immovable bad data sets and
9. the good and bad data require the same number of moves and
10. the bad data has higher activity Then the resolution strategy is MOVE_GOOD (27)

If
1. we are not willing to move all of the good data sets and
2. we are not willing to move the bad data Then the resolution strategy is SALVAGE_GOOD (28)

If
1. there are some totally immovable good data sets and
2. there are some totally immovable bad data sets Then the resolution strategy is SALVAGE_GOOD (29)

If
1. there are some immovable good data sets and
2. there are some immovable bad data sets and
3. the good data is not sufficiently active Then the resolution strategy is SALVAGE_GOOD (30)

If
1. we are willing to move all of the good data sets and
2. we are not willing to move the bad data and
3. there are some immovable good data sets and
4. (there are some totally immovable good data sets or
5. the good data is not sufficiently active)

Then the resolution strategy is SALVAGE_GOOD (31)

If
1. we are willing to move the bad data and
2. we are not willing to move all of the good data sets and
3. there are no immovable bad data sets and
4. there is not enough unwilling good data to justify any extra moves required to move the bad data Then the resolution strategy is SALVAGE_GOOD (32)

If
1. we are willing to move the bad data and
2. we are not willing to move all of the good data sets and
3. there are some immovable bad data sets and
4. (the good data is not sufficiently active or
5. there is not enough unwilling good data to justify any extra moves required to move the bad data or
6. there are some totally immovable bad data sets)

Then the resolution strategy is SALVAGE_GOOD

IMMOVABLE BAD

This attribute is true if there are any bad data sets (in the subset already selected) which are immovable.

IMMOVABLE GOOD

This attribute is true if any of the good data sets on the volume are immovable.

WILLING TO MOVE BAD

This attribute is true if we are willing to move the bad data sets off the volume. That is, it is true if the number of moves required to move the bad data sets is less than or equal to the number of moves we are willing to make.

The value of this attribute depends on the value of two other attributes:
moves willing, and
number of moves to move bad.

WILLING TO MOVE GOOD

This attribute is true if the decision is made to move all of the good data sets off the volume. With the bad data sets, the number of moves it took to move the data sets is compared with a selected number of moves to make to determine whether to move the bad data sets. With the good data sets though, the data sets may be move candidates based on the number of moves selected, but not selected to move because there are some good data sets which aren't worth moving due to their low activity. So, this attribute is true if all of the good data sets are worth moving and the number of moves required is less than or equal to a selected number of moves.

This attribute depends on the value of these attributes:

moves willing, and
number of moves to move good.

WHICH NEEDS MORE MOVES

The value of this attribute indicates whether it takes more moves to move the good data sets off the volume or whether it takes more moves to move the bad data sets. The values it can take are:

good,
bad, or
same.

This attribute depends on the value of the following attributes:

number of moves to move bad, and
number of moves to move good.

WHICH HAS MORE ACTIVITY

The value of this attribute indicates whether the activity of the good data is greater than or equal to the bad data or whether the bad data has more activity than the good data. The values it can take are:

good, or
bad.

GOOD DATA SUFFICIENTLY ACTIVE

This attribute is true if the combined activity of the good data is sufficiently active to consider moving immovable data sets. This decision is based on the activity of the good data on the volume relative to the total amount of good activity on the subsystem and also on the importance of obtaining more cache data.

The value of this attribute depends on the following attributes:

activity classification, and
importance of obtaining more cache data.

RULES

The rules used to determine whether the good data is sufficiently active are shown below.

(1)

if
1. the good data has moderate activity and
2. it is very important to obtain more cache data
then the good data is sufficiently active (2)

if
1. the good data has a high activity and
2. it is very important to obtain more cache data
then the good data has sufficient activity (3)

if
1. the good data has very high activity then the good data has sufficient activity

WHICH IS MORE IMMOVABLE

The value of this attribute indicates which of the good and bad data is more immovable than the other. At the moment, one type of data is more immovable than the other if the most immovable data set of the first type is more immovable than the most immovable data set of the other type. The values the attribute can have are:

good,
bad, or
same.

SOME BAD TOTALLY IMMOVABLE

This attribute is true if there is at least one bad data set which is totally immovable and must not be moved under any circumstances. For example VTOCs must never be moved for any reason.

SOME GOOD TOTALLY IMMOVABLE

This attribute is true if some of the good data sets are totally immovable.

ENOUGH UNWILLING GOOD

When there are good data sets that are not move candidates (because their activity is not high enough), this parameter indicates whether there are enough of these unwilling data sets to justify any extra moves it might take to move the bad data sets off the volume. The alternative is to try and move the good data sets that we are willing to move and leave the unwilling good data sets behind to end up on a bad volume. This attribute is true if the combined activity of the unwilling good data sets is enough to justify any extra moves required in moving the bad data sets off the conflict volume.

NUMBER OF MOVES TO MOVE BAD

The value of this attribute indicates the number of moves it will take to move the bad data sets off the conflict volume. The number of moves is determined by the Data Set Placement module 316.

NUMBER OF MOVES TO MOVE GOOD

This attribute gives the number of moves required to move all of the good data sets off the conflict volume. The number of moves is determined by the Data Set Placement module.

MOVES WILLING

When making movement recommendations, the procedure is to minimize the number of moves. For each conflict volume there is a number of moves that can be made based, principally, on the activity of the good data relative to the total amount of good data on the subsystem. So, where there is a lot of good data, more moves are desirable and where there is only a small amount of good data fewer moves are desirable.

As well as the activity of the good data, the value of the attribute importance of obtaining more cache data is scrutinized. If it is important to put more cache data on the cache volumes then the number of moves permitted is correspondingly higher.

RULES

The rules used for determining the number of moves are shown below.

(1)

if
1. the activity of the good data set is K1% of the total amount of good data on the subsystem and
2. it is not important to obtain more cache data then the number of moves we are willing to make for this data set is K2

(2)

if
1. the activity of the good data set is K% of the total amount of good data on the subsystem and
2. it is important to obtain more cache data then the number of moves we are willing to make is K3

(3)

if
1. the activity of the good data set is K1% of the total amount of good data on the subsystem and
2. it is very important to obtain more cache data then the number of moves permitted is K4

IMPORTANCE OF OBTAINING MORE CACHE DATA

This attribute reflects how important it is to obtain more cache data. Of course, it is always important to obtain more cache data but this attribute indicates whether it is more important than usual or not. The decision about whether it is important to obtain more cache data is based on the amount of cache data so far obtained and the amount anticipated. The possible values for this attribute are:

not important,
important, or
very important.

The way that this module measures the amount of good data it anticipates will end up on good volumes is to measure the amount of good data on easily resolved conflict volumes and add this to the amount of good data already residing on good volumes. This method gives a very rough measure that is used to determine whether to work harder at getting more good data onto cache volumes.

The concept of easily resolved conflicts is used to try and predict how much good data will end up cachable. The simplistic approach taken is to assume that the amount of good data that is not already cachable but that will end up cachable is about the same as the amount of good data currently residing on easily resolved conflict volumes.

RULES

The rules that are used to determine the importance of obtaining more cache data are shown below where r and s are user selected variables.

(1)

if
1. the amount of good data on good volumes is <r of total good measure by activity and
2. there is <r total good data (by activity) on easily resolved conflict volumes then it is very important to get more cache data (2)

if
1. if between r and s of the good data (by activity) is cachable and
2. there is <r total good on easily resolved then it is important to get more cache data (3)

if
1. more than s total good data is cachable then it is not important to get more cache data if
1. there is <r total good data on good volumes and
2. there is between r and s total good on easily resolved conflict volumes then it is important to get more cache data

EASILY RESOLVED CONFLICTS

In order to determine the importance of obtaining more cache data it is necessary to measure the amount of good data on easily resolved conflict volumes. A conflict volume is considered to be easily resolved if:
1. there are no immovable bad data sets, and
2. the number of moves we are willing to make for the good data is greater than or equal to the number of bad data sets that would have to be moved to turn the volume into a good volume.

ACTIVITY CLASSIFICATION

This module is used to classify the activity of some good data. The classification is one of:

low,
moderate,
high, or
very high.

The classification is based on the percentage of the total amount of good activity on the subsystem attributable to the good data being classified.

RULES

The rules used are shown below where t, u and v are preselected variables that are a function of device characteristics and user needs.

(1)

if
1. the activity of the good data is >=t of total good activity then the activity is very high (2)

if
1. the activity of the good data is >=u of total good and
2. the activity is <=t total good then the activity is high (3)

if
1. the activity is >=v total good and
2. the activity is <u total good then the activity is moderate (4)

if
1. the good data has some activity and
2. the activity is <v total good then the activity is low

SALVAGE GOOD DATA

During conflict resolution, the preferred options for resolving the conflict are to move all of the selected bad data sets off the volume or to move all of the good data sets off the volume. However, due to immovable data sets or the activity of the good data not being high enough to warrant the number of moves needed, it is possible that neither of these two options can be recommended. In this case the result of the resolution process is to recommend that the good data on the volume be salvaged. The salvage operation consists of examining each good data set on its own to determine whether it is worth moving to a good volume, thus making it cachable.

If a good data set is not immovable, then it is worth salvaging if the number of moves permitted is enough to move it. If a good data set is immovable but not totally immovable, then not only does the number of moves permitted have to be enough to move it, but it has to have sufficient activity to warrant its movement off the volume. A totally immovable good data set can never be salvaged.

RULES

The above conditions for salvaging a good data set can be expressed as the rules shown below.

(1)

if
1. we are willing to move the good data set and
2. the data set is not immovable
then move the data set (2)

if
1. we are willing to move the good data set and
2. the data set is immovable and
3. the data set has sufficient activity
then move the data set

DATA SET PLACEMENT

The data set placement routine 316 is used to decide where to place data sets that have been identified for movement. It attempts to recommend placement of a data set on the least active volume of the same classification on which it will fit. If there are no matching volumes on which the data set will fit, the data set placement routine 316 tries to find another data set on a matching volume that, when moved to another matching volume, frees enough space for the original data set. As a last resort the data set placement routine 316 considers moving the data set to another conflict volume for processing at a later date when hopefully it is easier to place.

When a place has been found for a data set to be moved to, a recommendation is generated and placed on the end of the list of current recommendations by calling the Generate Recommendations routine 318.

As well as actually placing data sets, the data set placement routine 316 is used during the conflict resolution process to determine how many moves are necessary to move a given set of data sets off a volume. This information is then used when deciding which of the good and bad data need more moves to be moved off a conflict volume.

GENERATE RECOMMENDATIONS

This routine takes data set movements and adds them to the list of current recommendations.

LAST PASS OPTIMIZATION

Just before the cache volume creation routine 302 finishes its analysis, the last pass optimization routine 308 is called in an attempt to find good volumes where one or two movements will result in a dramatic performance increase. The last pass optimization routine 308 looks at all of the good or cache candidate volumes and identifies where there are still one or two moderately high activity bad data sets that could be moved off the volume to increase the cache suitability of the volume.

If there is a bad data set on a good volume that accounts for more than a certain percentage of the total volume activity and can be moved off with only one move, then the movement of the data set off the volume is recommended (309). Similarly, if there is a good data set on a bad volume that accounts for more than a predetermined percentage of the total volume activity and it can be moved, then it is recommended (309) for movement off the volume.

DASD PERFORMANCE OPTIMIZER

The DASD Performance Optimizer, DPO, module 106, is one of the tuning analysis routines of intelligent storage manager 103. The DPO module 106 uses Artificial Intelligence techniques, e.g. Expert Systems, as well as mathematical analysis and modeling to analyze the performance of the various data storage devices in the computer system/network and make recommendations of data set movements that improve performance and service levels delivered to computer users.

The purpose of the DPO module 106 is to make data set movement recommendations with the aim of improving the performance and cost-effective utilization of various data storage devices while maintaining required user service levels. The module tries to minimize the computer resources expended in moving data in its recommendations.

The DPO module 106 recommendations are based on data that has been collected as a result of monitoring the I/O activity, results of analytical and simulation modelling, and characteristics of the devices and user workloads. The module works in such a way as to prevent serious problems occurring rather than waiting for them to occur before taking action. The DPO module 106 identifies devices and subsystems where conflicts exist, or where conflicts could exist and models alternative resolution strategies so as to make data set movement recommendations that rectify the situation while consuming minimum computer resources in movements. In this way, data sets are moved from conflict volumes to non-conflict volumes and subsystems to provide optimal levels of service.

The DPO module 106 also identifies where there are cache candidate data sets that could be moved to subsystems whose cache is being under-utilized. If necessary it also moves data sets off cache subsystems when the cache on the subsystem is over-loaded.

DASD PERFORMANCE OPTIMIZER

After some initialization, the DASD Performance Optimizer, module 402, tries to reorganize data sets that have been flagged for movement by the Cache Volume Creation module 105 so that they end up under appropriate cache controllers. This reorganization is done in the configuration definition—as opposed to physical movement of the data between devices—which is used for all subsequent analysis and is the basis for making recommendations to resolve conflicts. Depending on the system-level recommendations, the data movement proposed by cache volume creation module 105 may be altered.

The DASD Performance Optimizer, DPO, module 402, analyzes all data collected on data set activity and determines actual and potential performance conflicts. Then DPO module 402 identifies data sets which are causing the conflict. Each conflict which has been identified is processed in order of its priority. The processing involves choosing the best of the data sets, deciding where and when to move them or their associated user workloads, and generating appropriate recommendations. DPO module 402, controls the high level flow of execution and it calls operating system 102 to execute the list of data set move recommendations and to write these recommendations to the knowledge database 108.

INITIALIZE

The initialize routine 404 performs all initialization required including reformatting data if this is needed. This initialization process includes reading information from the database 108 to create internal records, e.g. objects and/or AI frames, for each data storage complex(s) at each node in the network(s), each subsystem in the complex, and each volume in each subsystem for which a record in the database exists. The initialization routine 404 also obtains pool and host sharing information about each of the volumes stored in the data storage system and creates objects and/or AI frames for each of the compatibility classes that exist. A compatibility class is a combination user pool, set of sharing hosts and device performance type.

PROCESS CVC RECOMMENDATIONS

If any moves are scheduled for data sets by the Cache Volume Creation (CVC) module 105, then the Process CVC Recommendations routine 405 alters the data to reflect the state the system would be in if the movements had been executed. The reason for doing this is that any recommended movements are executed after any moves that have been already scheduled and so data set move analysis is based on the assumption that the moves have been carried out.

IDENTIFY, RANK AND CLASSIFY CONFLICTS

The job of Identify, Rank and Classify Conflicts module 406 is to find conflicts. A conflict exists when user service level is not being met, e.g. a user service time exceeds an acceptable limit or a device is being misused, e.g. the amount of queuing for the device or path is unacceptable. Volumes or subsystems are identified as being in conflict when they reach contention or service level delivery above some safety margin below the acceptable standard. This safety margin allows actual problems to be corrected as well as preventing problems from arising by detecting potential problems.

IDENTIFY CONFLICT DEVICES

The Identify Conflict Devices module 411 identifies devices, control units, paths, etc., which contain conflicts. Detection of these conflicts is based on the Highlight for a device or path. The highlight measures are derived from I/O rate, pend time, disconnect time, IOSQ, and user service time (typically defined in a user service level agreement). The highlight value which constitutes a conflict is determined by the nature of the device or path and the user workload. It is distributed among various elements as determined by observation, mathematical modelling and Heuristics. In addition to observed highlight values, modelled and/or simulated highlight values can be used to identify potential conflicts.

Some examples of the sort or rules that might be used for determining whether a device or subsystem is in conflict are shown below where a, b, c, d, e, f and g are predetermined variables.

(1

If
  the highlight value is greater than a (where a is determined by the nature of the device and the user workload)
Then the device is in conflict (2)

If
  the service time is greater than b (where b is determined by the user workload characteristics)
Then the device is in conflict (3)

if
  {modelled queue time summarized at CU $<<$ observed queue time and the disconnect time is $>$ c and
  d $<$ the pend time + the IOSQ time are $<$ e and
  IORATE $>$ f} for more than g% of devices on control unit
Then Queue time is primarily due to variance of activity at control unit so must modify coefficient of variance used by model and then remodel to determine if CU is in conflict rather than device in conflict

CLASSIFY NATURE OF CONFLICT

The Classify Nature of Conflict/Problem module 412 classifies the identified conflicts in various categories. The category classification assists in both ranking conflicts and in determining viable resolution strategies. Some examples of categories might include:
  1. Device Contention (Internally separated into single/multi CPU)
  2. Head Stealing
  3. Excessive Seek
  4. Large Data Set
  5. Fragmentation
  6. Excessive Reserve (Internally separated into same and different data set)
  7. Controller Contention
  8. Back End Path Contention
  9. Excessive Staging
  10. Channel Contention
  11. Excessive Service Time
  12. Structurally Linked Workloads
  13. Excessive "Lock" or "Reserve" from Remote Locations
  14. Wrong Geographic Location The classification of a conflict into a specific category is determined by specific data which is either collected by monitoring module 171, or determined by the results of mathematical modelling or simulation. The actual classification is typically done via artificial intelligence techniques, e.g. a rule based expert system or a frame based expert system. An example of a partial frame-based implementation of classification is shown in FIG. 5.

A problem identification class 500 is related to a plurality of specific problems 510–516 each of which is associated with a particular physical subsystem in the data storage system. One example is device problem 516 which relates to the identification of a problem in the associated DASD devices 180. Each of the problems 510–516 is related via relationship 540–546 and objects 530–536 to an associated entity such as the data values identified by elements 520–526.

A specific problem, such as device problem 516, can itself by subdivided into a plurality of device specific problems 501–503, each of which is related to associated objects 504–509, 551–553. One specific example is the excessive head movement problem 502 which is termed "head stealing" in this technology. Head stealing typically occurs when an access to one dataset is interleaved with accesses to another. Therefore significant time is spent moving the read/write head between these datasets, rather than "doing work", reading and writing data.

Figure 5:
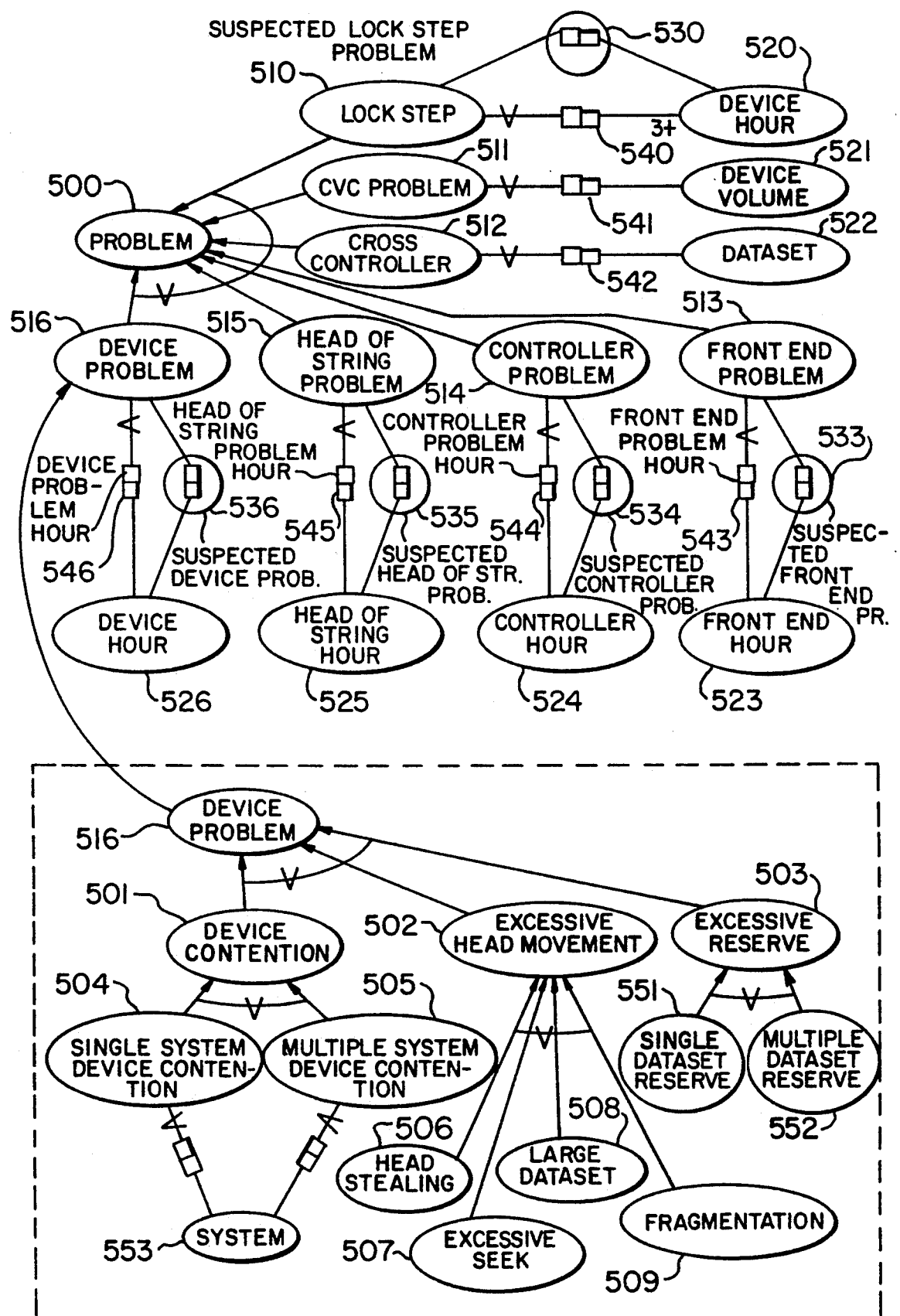
FIG. 5 illustrates an example of the objects used by the expert system model apparatus.

As shown in FIG. 5, head stealing is an example of excessive head movement which is an example of a device problem, which is in turn an example of a problem.

So a situation would be classified as head stealing when:
1. The performance model indicates the access delay is mostly due to device activity, (i.e. device problem 516).
2. A large seek time 507 indicates the device spends a lot of time moving the read/write head (i.e. excessive head movement 502).
3. The dataset information for this device was gathered at a time with a similar workload to the problem, and therefore the dataset information can be used to further classify the problem.
4. There is a small number of active datasets with interleaved activity (i.e. head stealing 506).

RANK CONFLICT/PROBLEM

The Rank Conflict module 413 calculates and estimates the magnitude and scope of the conflict. It does this by determining the likelihood that the observed symptoms in other timeframes have the same root cause as the conflict under consideration. This determines the scope of the conflict. The broader the scope, the greater the ranking assigned to this conflict. It then utilizes the actual, or the potential, delay and/or deviation from prioritized service requirements across the scope of the conflict to determine the magnitude of the conflict. Once this is accomplished for all identified conflicts the conflicts are ordered by their rank so that the worst problems are addressed first.

RESOLUTION OF CONFLICT

Once the conflicts have been identified, the Resolution of Conflicts module 407 finds combinations of data sets that when relocated will solve the problem. The Determine Resolution Strategy module 414 determines the appropriate solution strategy to resolve a conflict. The Determine Alternate Implementations to Resolve Conflict module 415 selects alternate combinations of data sets which if relocated would implement the resolution strategy. The Evaluate Impact of Implementation module 416 evaluates the system level implications of each proposed alternative and selects the optimal mix of relocations to maximize performance on the complex(s).

DETERMINE RESOLUTION STRATEGY

The Determine Resolution Strategy module 414 selects an appropriate strategy to resolve a conflict based on the type of conflict identified by Classify Nature of Conflict module 412. As an example of the process which might be followed in determining an appropriate strategy consider the following example rule where a, b and c are predetermined variables:

(1)

If
    the service level $<a$ and the user workload is located at node b and
    the data accessed is located at node c and
    the data classification is "can move nodes" and
    there are no other user workloads accessing this data during this time period
Then the resolution strategy is move nodes In the above example the strategy implies movement of some data from one node to another, or alternatively to move the user workload to the other node. In the case of device contention, the strategy would normally be to move some data access activity off of this device to another.

DETERMINE ALTERNATE IMPLEMENTATIONS

The Determine Alternate Implementations to Resolve Conflicts module 415 selects alternatives which typically involve the movement of data sets (movement of user workloads is frequently prohibited by user performance objectives—processing is usually required to be at the computer user's location for service level reasons if movement is permitted the implementation is analogous to moving datasets) that if implemented would resolve the conflict. In determining each alternative, this module considers availability of space and activity capacity for each of the devices in the compatibility class to which an identified conflict device is assigned. Greater consideration is given to the occurrence of a high level of both space and activity capacity than to a high level for only one.

This Determine Alternate Implementation module 415 attempts to minimize the computer resources consumed by movement of data. This most typically involves limiting the number of data sets relocated, but depending on the nature of the device, other factors may take greater precedence. One of the considerations in limiting the number of data sets relocated is their activity level. Low activity data sets are normally ignored since their contribution to the conflict is normally very low. The level of activity which constitutes a "low activity" data set is determined by the type of device and the characteristics of the user workload—especially required service level.

EVALUATE IMPACT OF IMPLEMENTATION

The Evaluate Impact of Implementation and Find Optimal Implementation module 416 works with the Determine Alternate Implementations module 415 to select the optimal implementations for resolving conflicts. Highest priority conflicts are given the highest priority in resolution. Likewise if there are implementations which can address multiple conflicts, these normally involve the minimal use of computer resources and therefore are given priority. Evaluation of the impact includes mathematical modelling and/or simulation of the proposed new configuration to determine if the conflict would be truly resolved and if the new configuration would create any new problems.

The Cache Volume Creation module 302 gave each cache candidate data set a classification of cache suitability. Evaluate Impact of Implementation module 16 uses this information to consider movement of data sets from devices where there are cache candidate data sets that can't be cached due to a lack of cache space to devices where there are under-utilized caches.

GENERATE RECOMMENDATIONS AND EXPLANATIONS

The Generate Recommendations and Explanations module 408 performs two basic functions: generating movement recommendations and generating human language explanations of all conflicts/problems along with the recommend solutions.

GENERATE RECOMMENDATIONS

Generate Recommendations module 417 generates the specific data set movement orders to implement the optimal strategies determined in Resolution of Conflict module 407. These movement orders are stored in the knowledge data base for processing by Movement module 173.

Depending on the user performance objectives, these movement orders can be directly executed by Movement module 173 or they can be held from execution until a human administrator or technician reviews and approves them. If the human disapproves, then the movement order is canceled.

GENERATE EXPLANATIONS

Generate Explanations module 418 generates human language explanations of the conflicts identified, their causes and proposed resolutions. This explanation is normally a multi-level explanation, in which the human can obtain increasing levels of detail if desired. This module generates the explanations. The actual computer on-line interaction with a human to review these explanations can take several forms such as: on-line computer session, paper printout, extract file for processing on another computer, e.g. a PC, etc.

MOVEMENT

The Movement module 173 reads the movement orders created by Generate Recommendations module 417 and causes them to happen. Movement module 173 interfaces with the operating system to ensure integrity of the data by appropriate category of data access on all appropriate computers and to actually move the data via appropriate operating system utility.

The above-described operational aspects of this system are simply applicable to additional data storage devices added to the data storage system. By simply changing or adding objects stored in the database, the new data storage devices can be modeled and the existing rule set described above would be applicable thereto. Thus, the addition of further data storage devices can be modeled in order to identify which volumes should be migrated to the additional data storage devices in order to optimize the performance of the data storage system.

SUMMARY

The memory performance improvement apparatus identifies memory performance conflicts, such as a performance degradation of the computer system data storage devices due to a plurality of computers in the computer system attempting to access a common data storage device. The memory performance improvement apparatus identifies the performance conflict as well as the data sets stored on these data storage devices and user workload reload to this conflict. Once the data sets and user workloads involved in the performance conflict are identified, the memory performance improvement apparatus determines alternative memory storage locations for these data sets, or alternatively, alternate locations for processing the user workload, and activates-various software routines to transport these conflict data sets or workloads to the alternative location.

The relocation of these conflict data sets and/or workloads resolves the memory performance conflict and improves the retrievability of the data stored on the computer system(s). By performing the conflict identification and resolution on a dynamic real time basis, the data storage devices of the computer system are operated in a more efficient manner and the retrievability of the data stored on these data storage devices is significantly improved without the need for the data management personnel. The computer system memory performance improvement apparatus therefore continuously monitors and modifies the performance of the data storage devices associated with the computer system.

While a specific embodiment of the invention has been illustrated, it is expected that those skilled in the art can and will device variations of this system that fall within the scope of the appended claims.

We claim:

1. A method for dynamically reorganizing placement of data in memory of a computer system to improve retrievability of data stored therein comprising the steps of:
   monitoring the operation of said computer system memory;
   detecting memory performance conflicts in said computer system memory;
   identifying datasets in said computer system memory that must be relocated to resolve said memory performance conflicts;
   validating relocation of said identified datasets to resolve said memory performance conflicts, comprising:
   storing information describing a configuration of said computer system memory,
   storing a set of functional rules describing a data management function,
   mathematically modeling at least a portion of said computer system memory, and
   collecting performance data on said identified datasets to validate relocation of said identified datasets to resolve said memory performance conflicts.

2. The method of claim 1 further comprising the step of:
   generating said information describing said configuration of said computer system memory.

3. The method of claim 1 wherein said step of detecting includes:

predicting potential performance conflicts in said computer system memory.

4. The method of claim 3 wherein said step of detecting further includes:
calculating statistical data from dataset read/write activity indicative of the frequency of usage and locale of the datasets stored in said computer system memory.

5. The method of claim 4, where said computer system memory includes a plurality of DASD units, said step of identifying includes:
listing the ones of said DASD units that are in greatest and least conflict with performance objectives.

6. The method of claim 5 wherein said step of identifying further includes:
selecting datasets from the ones of said DASD units listed as being in greatest conflict and from the ones of said DASD units listed as being in least conflict for exchange therebetween to balance the activity on these listed DASD units.

7. The method of claim 6 further comprising the step of:
exchanging said selected datasets between said listed DASD units to reduce the conflict on these listed DASD units.

8. The method of claim 4 where said computer system memory includes a plurality of DASD units and a cache memory, said step of identifying includes:
classifying all the datasets on a DASD unit that are good and bad candidates for relocation to said cache memory.

9. The method of claim 8 wherein said step of identifying further includes:
listing the ones of said datasets, classified as good candidates for relocation to said cache memory, that can be stored on one volume in said DASD unit.

10. The method of claim 9 further comprising the step of:
transporting said listed datasets to said one volume in said DASD unit to resolve said memory performance conflicts.

11. The method of claim 1 wherein said step of mode further includes:
generating data describing operational details of said configuration of said computer system memory.

12. The method of claim 1 further comprising the step of:
transporting said identified datasets to alternate memory storage locations to resolve said memory performance conflicts.

13. The method of claim 1 wherein said computer system memory further includes at least one data channel connecting said computer system to a control unit which manages a plurality of DASD units, said step of detecting includes:
monitoring channel, control unit, device and dataset read/write activity in said computer system memory.

14. The method of claim 1 wherein said step of modeling further includes:
storing a set of functional rules describing performance characteristics of data storage devices that comprise said computer system memory; and
storing a set of functional rules describing desired service levels for said data storage devices.

15. The method of claim 14 wherein said step of detecting includes:
predicting potential performance conflicts in said computer system memory; and
identifying at least one of said data storage devices subject to said predicted performance conflicts.

16. The method of claim 14 wherein said step of modeling further includes:
generating data describing operational details of said data storage devices in said computer system memory.

17. A system for dynamically reorganizing placement of data in memory of a computer system to improve retrievability of data stored therein comprising:
means for monitoring the operation of said computer system memory;
means, responsive to said monitoring means, for detecting memory performance conflicts in said computer system memory;
means, responsive to said detecting means, for identifying datasets in said computer system memory that must be relocated to resolve said memory performance conflicts;
means for validating relocation of said identified datasets to resolve said memory performance conflicts, comprising:
means for storing information describing a configuration of said computer system memory,
means for storing a set of functional rules describing a data management function,
means for mathematically modeling at least a portion of said computer system memory, and
means for collecting performance data on said identified datasets.

18. The system of claim 17 further comprising:
means for generating said information describing said configuration of said computer system memory.

19. The system of claim 17 wherein said detecting means includes:
means for predicting potential performance conflicts in said computer system memory.

20. The system of claim 19 wherein said detecting means further includes:
means for calculating statistical data from dataset read/write activity indicative of the frequency of usage and locale of the datasets stored in said computer system memory.

21. The system of claim 20, where said computer system memory includes a plurality of DASD units, said identifying means includes:
means for listing the ones of said DASD units that are in greatest and least conflict with performance objectives.

22. The system of claim 21 wherein said identifying means further includes:
means responsive to said listing means for selecting datasets from the ones of said DASD units listed as being in greatest conflict and from the ones of said DASD units listed as being in least conflict for exchange therebetween to balance the activity on these listed DASD units.

23. The system of claim 22 further comprising:
means responsive to said identifying means for exchanging said selected datasets between said listed DASD units to reduce the conflict on these listed DASD units.

24. The system of claim 20 where said computer system memory includes a plurality of DASD units and a cache memory, said identifying means includes:

means for classifying all the datasets on a DASD unit that are good and bad candidates for relocation to said cache memory.

25. The system of claim 24 wherein said identifying means further includes:
means for listing the ones of said datasets, classified as bad candidates for relocation to said cache memory, that can be stored on one volume in said DASD unit.

26. The system of claim 25 further comprising:
means responsive to said identifying means for transporting said listed datasets to said one volume in said DASD unit to resolve said memory performance conflicts.

27. The system of claim 17 wherein said modeling means further includes:
means for generating data describing operational details of said configuration of said computer system memory.

28. The system of claim 17 further comprising:
means responsive to said identifying means for transporting said identified datasets to alternate memory storage locations to resolve said memory performance conflicts.

29. The system of claim 17 wherein said computer system memory further includes at least one data channel connecting said computer system to a control unit which manages a plurality of DASD units, said detecting means includes:
means for monitoring channel, control unit, device and dataset read/write activity in said computer system memory.

30. The system of claim 17 wherein said modeling means further includes:
means for storing a set of functional rules describing performance characteristics of data storage devices that comprise said computer system memory; and
means for storing a set of functional rules describing desired service levels for said data storage devices.

31. The system of claim 30 wherein said detecting means includes:
means for predicting potential performance conflicts in said computer system memory; and
means for identifying at least one of said data storage devices subject to said predicted performance conflicts.

32. The system of claim 30 wherein said modeling means further includes:
means for generating data describing operational details of said data storage devices in said computer system memory.

33. A system for dynamically reorganizing placement of data in memory of a computer system to improve retrievability of data stored therein, wherein said computer system memory is a hierarchial memory including a cache memory and a plurality of DASD units, comprising:
means for monitoring the operation of said computer system memory;
means, responsive to said monitoring means, for detecting memory performance conflicts in both said cache memory and said DASD units in said computer system memory;
means, responsive to said detecting means, for identifying datasets in said computer system memory that must be relocated to resolve said memory performance conflicts;
means for validating relocation of said identified datasets to resolve said memory performance conflicts, comprising:
means for storing information describing a configuration of said computer system memory,
means for storing a set of functional rules describing a data management function,
means for mathematically modeling at least a portion of said computer system memory, and
means for collecting performance data on said identified datasets to validate a relocation of said identified datasets to resolve said memory performance conflicts.

34. The system of claim 33 further comprising:
means responsive to said identifying means for transporting said identified datasets to alternate memory storage locations to resolve said memory performance conflicts.

35. The system of claim 33 wherein said detecting means includes:
means for monitoring dataset read/write activity in said computer system memory;
means for calculating statistical data from said monitored dataset read/write activity indicative of the frequency of usage and locale of the datasets stored in said computer system memory.

36. The system of claim 33 wherein said identifying means includes:
means for listing the ones of said DASD units that are most and least utilized;
means responsive to said listing means for selecting datasets from the ones of said DASD units listed as most utilized and from the ones of said DASD units listed as least utilized for exchange therebetween to balance the activity on these listed DASD units.

37. The system of claim 36 further comprising:
means responsive to said identifying means for exchanging said selected datasets between said listed DASD units to balance the activity on these listed DASD units.

38. The system of claim 33 wherein said identifying means includes:
means for classifying all the datasets on a DASD unit that are good and bad candidates for relocation to said cache memory;
means for listing the ones of said datasets, classified as good candidates for relocation to said cache memory, that can be stored on one volume in said DASD unit.

39. The system of claim 38 further comprising:
means responsive to said identifying means for transporting said listed datasets to said one volume in said DASD unit to resolve said memory performance conflicts.

40. The system of claim 33 wherein said modeling means further includes:
means for storing a set of functional rules describing performance characteristics of each of said DASD units; and
means for storing a set of functional rules describing desired service levels for each of said DASD units.

41. The system of claim 40 wherein said detecting means includes:
means for predicting potential performance conflicts in said computer system memory; and
means for identifying at least one of said DASD units subject to said predicted performance conflicts.

42. The system of claim 40 wherein said modeling means further includes:
- means for generating data describing operational details of said DASD units.

43. A system for dynamically reorganizing the placement of data in memory of a computer system to improve the retrievability of data stored therein, wherein said computer system memory is a hierarchial memory including a cache memory and a plurality of DASD units, comprising;
- means for storing information describing the configuration of said computer system memory;
- means for storing a set of functional rules describing a data management function;
- means for mathematically modeling at least a portion of said computer system memory;
- means for detecting memory performance conflicts in said computer system memory, including:
  - means for monitoring the dataset read/write activity in said computer system memory;
  - means for calculating statistical data from said monitored dataset read/write activity indicative of the frequency of usage and locale of the datasets stored in aid computer system memory;
- means, responsive to said detecting means, for identifying datasets in said computer system memory that must be relocated to resolve said memory performance conflicts, including:
  - means for listing the ones of said DASD units that are most and least utilized;
  - means, responsive to said listing means, for selecting datasets form the ones of said DASD units listed as most utilized and from the ones of said DASD units listed as lest utilized for exchange therebetween to balance the activity on these listed DASD units;
  - means for classifying all the datasets on a DASD unit that are good and bad candidates for relocation to said cache memory;
  - means for listing the ones of said datasets, classified as good candidates for relocation to said cache memory, that can be stored on one volume in said DASD unit;
- means, responsive to said identifying means, for exchanging said selected datasets between said listed DASD units to balance the activity on these listed DASD units;
- means, responsive to said identifying means, for transporting said listed datasets to said one volume in said DASD unit to resolve said memory performance conflicts; and
- means for writing said one volume from said DASD unit into said cache memory.

44. A method of improving the data retrieval efficiency of a computer system memory, wherein said computer system memory is a hierarchial memory including a cache memory and a plurality of DASD units, comprising the steps of:
- recording information describing the configuration of said computer system memory;
- storing a set of functional rules describing a computer system memory management function;
- mathematically modeling at least a portion of said computer system memory;
- monitoring the operation of both said cache memory and said DASD units;
- detecting memory performance conflicts as a result of said monitoring;
- identifying datasets in said computer system memory that must be relocated to resolve said memory performance conflicts;
- transporting said identified datasets to alternate memory storage locations to resolve said identified memory performance conflicts.

* * * * *